Oct. 28, 1930.        R. J. KEHL        1,779,740
VALVE
Filed Sept. 28, 1928

Robert J. Kehl,
INVENTOR,
ATTORNEYS.

Patented Oct. 28, 1930

1,779,740

UNITED STATES PATENT OFFICE

ROBERT J. KEHL, OF NEW YORK, N. Y., ASSIGNOR TO OXWELD ACETYLENE COMPANY, A CORPORATION OF WEST VIRGINIA

VALVE

Application filed September 28, 1928. Serial No. 309,031.

This invention pertains to manually operable fluid regulating valves of small size and more specifically to means for securing a freer flow of fluid through such valves.

Valves may be divided into two classes according to their comparative sizes and the methods employed in their manufacture, the first class including valves having a separate bonnet and a cast body with the inlet, outlet, and bonnet, openings cast therein; and the second class including valves having a body and bonnet in one piece with all openings machined therein.

This invention pertains to valves of the second class and these valves may be made with inlet and outlet couplings so they may be inserted in a pipe line; with only one coupling like a petcock; or the valve may form an integral portion of some other piece of apparatus. The openings in these valves are so small that it is impossible or impractical to cast them in the valve body, so instead, they are machined in the valve body by such operations as drilling, tapping, countersinking, counterboring, and milling.

The practice, heretofore, has been to cast a valve body of the desired shape and into this cast body to drill a valve stem opening part way through. From the bottom of the valve stem opening a fluid passage of smaller size was then drilled somewhat farther into the valve body. By the use of an end mill having a tapered point the shoulder between the valve stem opening and the fluid passage extending therefrom was then machined to form a valve seat and the valve stem opening was tapped or threaded down almost to the valve seat. An inlet opening was drilled to the fluid passage below the valve seat and an outlet opening was drilled to the valve stem opening above the valve seat. The valve stem was made with a threaded portion fitting into the threaded portion of the valve stem opening; an end having a taper corresponding to the taper of the valve seat thereby forming a valve on the end of the valve stem; and a short unthreaded portion just back of the end of the valve stem forming a clearance space around the valve stem just above the seat where it is impractical to thread it. A stuffing box, gland, and packing nut, for preventing leakage between the valve stem and valve body; suitable threads or couplings at the inlet and outlet openings; and a suitable handle on the valve stem usually completed the valve.

Under operating conditions where the full capacity of the valve is required this valve causes considerable trouble because the valve stem must be moved such a long distance to secure the full capacity of the valve. The reason why the valve stem must be moved such a long distance is because the end of the valve stem is so close to the wall of the valve stem opening that the fluid flowing through the valve can leave the opening in the valve seat only at the side of the valve stem where the outlet opening joins the valve stem opening. When a coarser thread is used on the valve stem so it moves farther with less turns it is then difficult to seat the valve on the valve seat with sufficient pressure to prevent leakage. Therefore, one of the objects of this invention is the provision of a valve having a free fluid passage from the opening in the valve seat to all sides of the valve stem. Furthermore, this invention includes all the other objects and novel features described and shown herein.

I attain the objects of this invention by the apparatus shown in the accompanying illustration in which.

The apparatus embodying my invention may comprise a valve body 10 of cast metal such as brass having a threaded inlet coupling 11 at one side and a similar threaded outlet coupling 12 at another side. The inlet and outlet couplings shown are a well known type adapted for coupling the valve to flexible copper or brass tubing but this particular form of coupling is not essential as any other form may be used or, where the valve forms an integral part of another piece of apparatus such as the rear body of a welding or cutting blow-pipe, the couplings may be dispensed with entirely. Furthermore, the position of the couplings with relation to the valve stem is not essential as the couplings and the inlet and outlet openings in the valve may occupy other positions than those shown.

Figure 1:
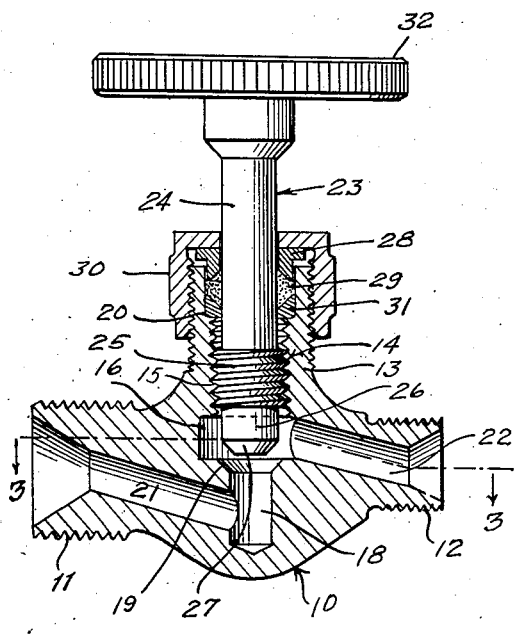
Figure 1 is a vertical section of a valve embodying my invention.
Figure 2:
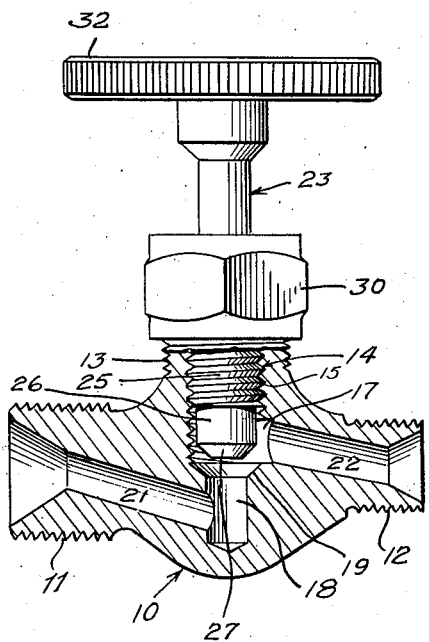
Figure 2 is a similar view of a valve only partially in section embodying a modified form of my invention; and, Figure 3 is a horizontal section of the valve shown in Figure 1 along the line 3—3 looking in the direction of the arrows.
Figure 3:
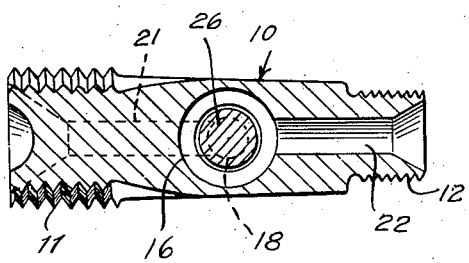

Rising from the top of the valve body 10 and integral therewith is a bonnet 13 and drilled downward through the bonnet 13 and into the valve body 10 is a valve stem opening 14 having a threaded portion 15. Below the threaded portion 15 is an enlarged portion 16 that is made by inserting a small side milling tool through the valve stem opening 14 and then moving it to one side while it is rotating thereby making the enlargement 17 as shown in Figure 2, or the milling cutter may be moved to all sides to produce the annular enlargement 16 shown in Figures 1 and 3. When the valve stem opening 14 is enlarged at one side only as shown at 17 in Figure 2 it is desirable that this enlargement be made at the side of the valve stem opening where it is joined by the outlet opening. The annular enlargement 16 may also be made by inserting an expanding or undercutting tool in the valve stem opening 14 and the enlargement may be of a different shape or form from the examples shown.

From the bottom of the valve stem opening 14 a fluid passage 18 of smaller size than the valve stem opening and in axial alignment therewith is drilled somewhat farther into the valve body 10 but not all the way therethrough. By means of an angular end milling cutter or a counterbore the shoulder between the valve stem opening 14 and the fluid passage 18 is formed into a valve seat 19. Above the threaded portion 15 of the valve stem opening 14 the bonnet 13 is counterbored to form a stuffing box 20. An inlet passage 21 is drilled from the inlet coupling 11 to the fluid passage 18, and an outlet passage 22 is drilled from the outlet coupling 12 to the enlarged portion 16 or 17 of the valve stem opening 14.

In the valve stem opening 14 is a valve stem 23 having an unthreaded portion 24 in the stuffing box 20; a threaded portion 25 in the threaded portion 15 of the valve stem opening 14; an unthreaded portion 26 in the enlargement 16 of the valve stem opening 14; and a tapered end forming a valve 27 that may be seated on the valve seat 19. The length of the various portions of the valve stem 23 may vary. The threaded portion 25 should be long enough to have sufficient strength to move the valve stem when it is rotated, sufficient wearing surface to prevent undue wear, and short enough to permit the valve to be opened to full capacity volume before the upper end of the threaded portion 25 of the valve stem 23 strikes the ring 31 in the bottom of the stuffing box 20. Around the upper end of the valve stem 23 in the bottom of the stuffing box 20 is a metal ring 31 that forms a seat for the packing 29 just above it, thereby preventing the packing 29 from being forced into the threaded portion 15 of the valve stem opening 14, and also forming a buffer for the upper end of the threaded portion 25 of the valve stem 23, to prevent it from mutilating the packing 29 when the valve is opened to the limit of the valve stem movement. Above the packing 29 is a gland 28 that is adapted for compressing the packing 29 in the stuffing box 20. A packing nut 30 is threaded to the outside of the bonnet 13 and surrounds the valve stem 23 and bears upon the gland 28 so that when the packing nut 30 is screwed down on the bonnet 13 the gland 28 is forced into the stuffing box 20 and the packing 29 is compressed so leakage between the valve stem 23 and the wall of the valve stem opening 14 of the bonnet and valve body 10 is prevented. Secured to the upper end of the valve stem 23 is a suitable handle 32 by means of which the valve stem 23 may be manually rotated for opening and closing the valve. The handle 32 may be of a form other than that shown.

When the valve is in operation a high pressure fluid pipe line may be connected to the inlet coupling 11, and a low pressure fluid pipe line may be connected to the outlet coupling 12. When the valve is closed, by screwing the valve stem 23 down until the valve 27 is pressed firmly against the valve seat 19, no fluid will flow through the valve. When the valve stem 23 is moved upward to the limit of its travel the valve is fully open and fluid may flow through the valve to its full capacity volume. By opening the valve different degrees fluid may be permitted to flow through the valve at various rates less than that of full capacity.

Without the enlargement 16 or 17 of the valve stem opening 14 it was found necessary to open the valve six full turns of the valve stem 23 to secure a full capacity flow through the valve. With the enlargement 17 of the valve stem opening 14 it was necessary to open the valve three and one-half turns to secure a full capacity flow, and with the enlargement 16 of the valve stem opening it was found necessary to open the valve only two and one-half turns of the valve stem to secure a full capacity flow of fluid through the valve. Therefore, it is evident that the efficiency of the valve is greatly increased by the improved construction shown and described herein. Furthermore, it may be opened and closed quicker or it may be closed more securely than valves known heretofore.

Various changes may be made in the construction of the valve, various alterations may be made in the assembly, and various substitutions may be made for the materials described without departing from the invention or sacrificing any of the rights thereunder.

I claim:

1. A valve having a cast body with all openings machined therein and comprising; a threaded valve stem opening having a conical bottom forming a valve seat; a fluid passage through said valve body and valve seat; and a threaded valve stem in said valve stem opening having a beveled end seating on said valve seat for closing said fluid passage; said valve stem opening being enlarged adjacent said valve seat to provide a free fluid passage around said valve stem from the opening through said valve seat 2. A valve having a cast body with all openings machined therein and comprising; a threaded valve stem opening having a conical bottom forming a valve seat; a fluid passage through said valve body and valve seat; a threaded valve stem in said valve stem opening having a beveled end seating on said valve seat for closing said fluid passage; said valve stem opening being enlarged adjacent said valve seat to provide a free fluid passage around said valve stem from the opening through said valve seat; and means for preventing leakage between said valve stem and said body.

3. A valve having a cast body with all openings machined therein and comprising; a threaded valve stem opening having a conical bottom forming a valve seat; a fluid passage through said valve body and valve seat; a threaded valve stem in said valve stem opening and having a beveled end seating on said valve seat for closing said fluid passage; said valve stem opening being enlarged adjacent said valve seat to provide a free fluid passage around said valve stem from the opening in said valve seat; a handle on the outer end of said valve stem by which it may be operated; and means for preventing leakage between said valve stem and said body.

4. A valve having a cast body with all openings machined therein and comprising; a valve stem opening having a conical bottom forming a valve seat, a threaded portion, and an enlarged portion between said valve seat and said threaded portion; a fluid passage through said valve body and valve seat; and a valve stem in said valve stem opening having a threaded portion in the threaded portion of said valve stem opening, an unthreaded portion in the enlarged portion of said valve stem opening, and a beveled portion seating on said valve seat for closing said fluid passage.

5. A valve having a cast brass body with all openings machined therein and comprising; a valve stem opening having a conical bottom forming a valve seat, a threaded portion, and an enlarged portion between said valve seat and said threaded portion; a fluid passage through said valve body and valve seat; and a valve stem in said valve stem opening having a threaded portion in the threaded portion of said valve stem opening, an unthreaded portion in the enlarged portion of said valve stem opening, and a beveled portion seating on said valve seat for closing said fluid passage.

6. A valve having a cast body; a drilled and threaded valve stem opening in said body having a tapered bottom forming a valve seat and an enlarged portion above said valve seat; a passage smaller in diameter than said valve stem opening extending axially therefrom through said valve seat; an inlet opening drilled in said body to said passage; an outlet opening drilled in said body to the enlarged portion of said valve stem opening; and a threaded valve stem in said valve stem opening having a valve on the end thereof seating on said valve seat.

7. A valve having a cast body with an inlet coupling and an outlet coupling thereon; a valve stem opening drilled in said body having a tapered bottom forming a valve seat, an enlarged portion above said valve seat, and a threaded portion above said enlarged portion; a passage drilled from said valve stem opening through said valve seat; an inlet opening drilled from said inlet coupling to said passage; an outlet opening drilled from said outlet coupling to the enlarged portion of said valve stem opening; and a threaded valve stem in said valve stem opening having a beveled end forming a valve adapted for seating on said valve seat.

8. The combination in a valve having all openings machined in the body thereof, of a cast valve body; a passage for conducting a fluid through said valve body; means including a valve seat surrounding said passage between the inlet and outlet openings and a valve stem with a valve on the end thereof for regulating the flow of fluid through said valve body; and a clearance space in said passage for providing a flow of fluid around all sides of said valve stem between the valve seat and the outlet opening.

9. The combination in a valve having all openings machined in the body thereof, of a valve body of cast brass; a passage for conducting a fluid through said valve body; means including a valve seat surrounding said passage between the inlet and outlet openings and a valve stem with a valve on the end thereof for regulating the flow of fluid through said valve body; and a clearance space in said passage for providing a flow of fluid around all sides of said valve stem between the valve seat and the outlet opening In testimony whereof I affix my signature.

ROBERT J. KEHL.